United States Patent
Perumalla et al.

(10) Patent No.: US 12,552,017 B2
(45) Date of Patent: Feb. 17, 2026

(54) OPTIMIZING ROBOTIC DEVICE PERFORMANCE

(71) Applicant: International Business Machines Corporation, Armonk, NY (US)

(72) Inventors: Saraswathi Sailaja Perumalla, Visakhapatnam (IN); Sarbajit K. Rakshit, Kolkata (IN); Akash U. Dhoot, Pune (IN); Sowjanya Rao, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 17/804,790

(22) Filed: May 31, 2022

(65) Prior Publication Data
US 2023/0405809 A1 Dec. 21, 2023

(51) Int. Cl.
*B25J 9/16* (2006.01)
*B25J 9/08* (2006.01)
(Continued)

(52) U.S. Cl.
CPC ............ *B25J 9/1605* (2013.01); *B25J 9/08* (2013.01); *B25J 9/1671* (2013.01); *B25J 9/1674* (2013.01);
(Continued)

(58) Field of Classification Search
CPC .... B25J 9/1605; B25J 19/007; B25J 19/0075; B25J 9/1674; B25J 9/1671; G05B 19/4155; G05B 2219/50391
See application file for complete search history.

(56) References Cited

U.S. PATENT DOCUMENTS

| 8,533,619 B2 | 9/2013 | Baier |
| 9,811,074 B1 | 11/2017 | Aichele |

(Continued)

FOREIGN PATENT DOCUMENTS

| CN | 101685295 A | 3/2010 |
| CN | 105182792 A * | 12/2015 |

(Continued)

OTHER PUBLICATIONS

Authority and translation documentation of the above-noted foreign patent documents are provided as combined PDF files in this office action.*

(Continued)

*Primary Examiner* — Jason Holloway
*Assistant Examiner* — Benjamin J Brosh
(74) *Attorney, Agent, or Firm* — Kimberly Zillig

(57) ABSTRACT

A processor may receive environment data associated with one or more robotic devices and an environment. The one or more robotic devices may be configured to perform one or more activities in the environment. The processor may analyze the environment data and the one or more activities in the environment. The processor may identify one or more performance factors associated with the environment. The processor may generate one or more simulations associated with the one or more performance factors and the one or more robotic devices in the environment. The processor may apply one or more protective components to the one or more robotic devices. Applying the one or more protective components to the one or more robotic devices may be based, at least in part, on the one or more simulations.

17 Claims, 5 Drawing Sheets

(51) Int. Cl.
  *B25J 19/00* (2006.01)
  *G05B 19/4155* (2006.01)
(52) U.S. Cl.
  CPC ........ *B25J 19/007* (2013.01); *G05B 19/4155* (2013.01); *B25J 19/0075* (2013.01); *G05B 2219/50391* (2013.01)

(56) References Cited

U.S. PATENT DOCUMENTS

| | | | |
|---|---|---|---|
| 9,821,463 | B2 | 11/2017 | Kuffner, Jr. |
| 2019/0389060 | A1 | 12/2019 | Roy Chaudhuri |
| 2020/0122329 | A1 | 4/2020 | Prinz |
| 2021/0053224 | A1 | 2/2021 | Schroeder |
| 2022/0118611 | A1* | 4/2022 | Geissler ............... B25J 9/1679 |
| 2022/0148404 | A1* | 5/2022 | Watson ............... G08B 21/02 |

FOREIGN PATENT DOCUMENTS

| | | | |
|---|---|---|---|
| CN | 111059454 | A | 4/2020 |
| CN | 109760060 | B | 6/2021 |
| CN | 119300958 | A | 1/2025 |
| ES | 1061745 | U | 7/2006 |
| KR | 20210065409 | A * | 6/2021 |
| WO | 2023/231441 | A1 | 12/2023 |

OTHER PUBLICATIONS

CN 105182792 A, Li et al., Robot working simulation system under nuclear radiation environment and method thereof, Filed: Aug. 10, 2015, Pub: Dec. 23, 2015, English Translation (Year: 2015).*
KR 20210065409 A, Lee et al., Method and Apparatus for Collision Avoidance Trajectory Planning of Autonomous Vehicle, Filed: Nov. 27, 2019, Pub Jun. 4, 2021, English Translation (Year: 2021).*
Mell, et al., "The NIST Definition of Cloud Computing", National Institute of Standards and Technology, Special Publication 800-145, Sep. 2011, 7 pages.
"Patent Cooperation Treaty PCT Notification of Transmittal of the International Search Report and the Written Opinion of the International Searching Authority, or the Declaration", Applicant's file reference EIE230081PCT, International application No. PCT/CN2023/074816, International filing date Feb. 7, 2023, Date of Mailing Apr. 17, 2023, 8 pages.
Protecting your Robot with Robosuit, Robotics Tomorrow, Jun. 14, 2018, 16 pages, doi: https://www.roboticstomorrow.com/article/2018/06/protecting-your-robot-with-robosuit/12076.

* cited by examiner

OPTIMIZING ROBOTIC DEVICE PERFORMANCE

BACKGROUND

Aspects of the present disclosure relate generally to the field of artificial intelligence, and more particularly to using robotic devices to perform various activities.

As technology associated with robotics has advanced, a greater understanding of how robotics can be applied to different tasks and industrial operations has also developed. The area of robotics has been used to revolutionize manufacturing and assembly of various objects, from computer components to buildings. Robotic devices can also be used to perform various actives in environments that are inaccessible and/or unsafe for people to enter, such as environments with extreme temperatures.

SUMMARY

Embodiments of the present disclosure include a method, computer program product, and system for optimizing robotic device performance.

A processor may receive environment data associated with one or more robotic devices and an environment. The one or more robotic devices may be configured to perform one or more activities in the environment. The processor may analyze the environment data and the one or more activities in the environment. The processor may identify one or more performance factors associated with the environment. The processor may generate one or more simulations associated with the one or more performance factors and the one or more robotic devices in the environment. The processor may apply one or more protective components to the one or more robotic devices. Applying the one or more protective components to the one or more robotic devices may be based, at least in part, on the one or more simulations.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
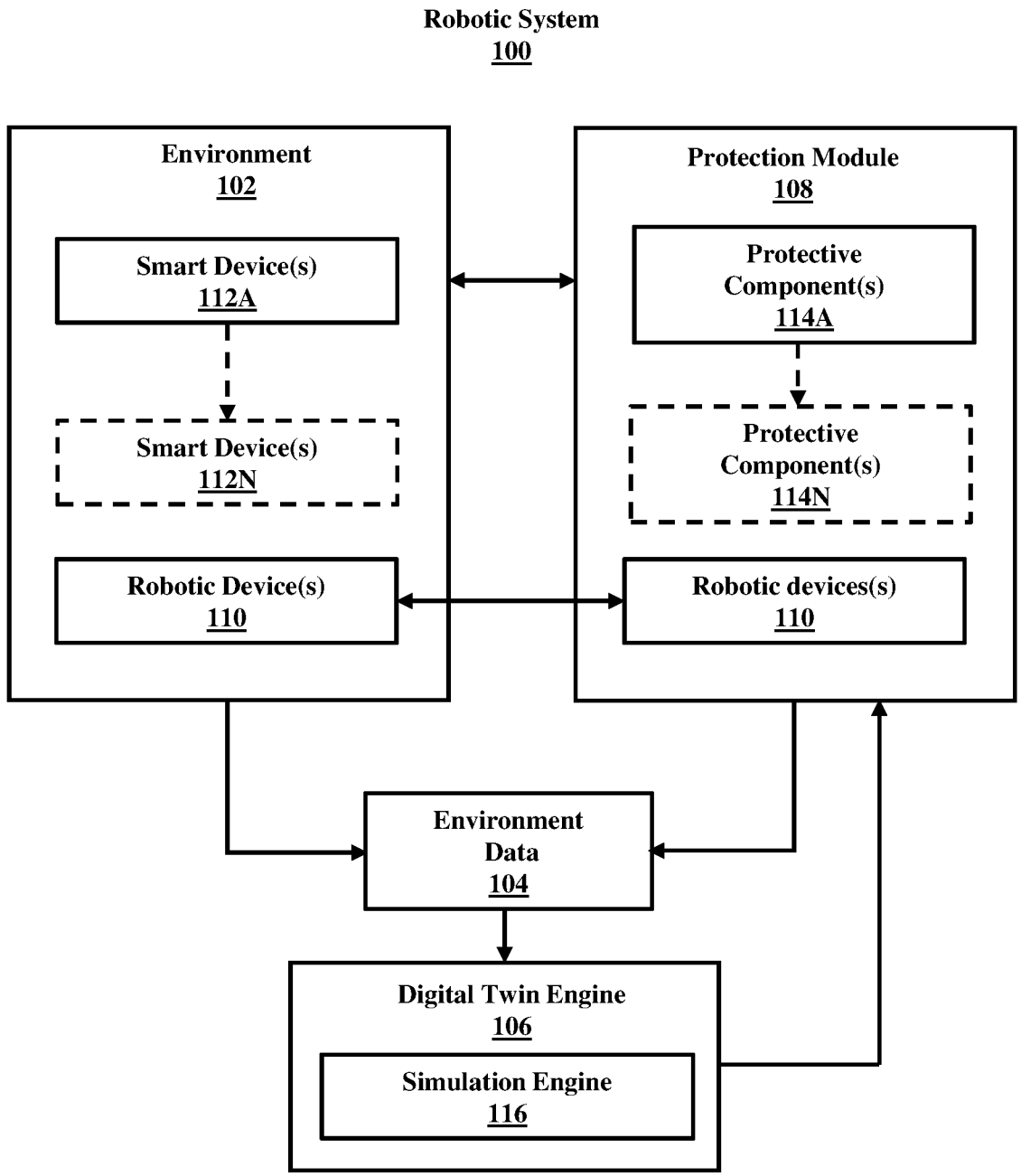
FIG. 1 illustrates a block diagram of an example robotic system, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of artificial intelligence, and, more particularly, to using robotic devices to perform various activities. While the present disclosure is not necessarily limited to such applications, various aspects of the disclosure may be appreciated through a discussion of various examples using this context.

Robotics have revolutionized how various activities are performed. While robotic devices are often used in manufacturing or assembling processes, they can also be used to perform specific actions within disparate environments, such as those that are unsafe or inaccessible to people. For example, some manufacturing processes may require the product be in an acidic environment while preforming a particular step of a chemical process. While the acidic environment may be unsafe for a person to enter to retrieve the completed product, a robotic device (e.g., robotic arm) may be used to enter the acidic environment and retrieve the completed product. While various embodiments contemplated herein refer to the use of a robotic arm or other mechanisms, such embodiments are used as examples only and should not be construed as limiting.

Unfortunately, while robotic devices may be able to enter environments that are unsafe or inaccessible to people, in some environments the robotic devices may receive some damage as a result of entering a particular environment (e.g., environments with extreme temperatures) or performing a particular activity (e.g., where the robotic device aids in the performance of a chemical process). To combat the damage a robotic device might incur while entering a particular environment or performing a particular activity, the robotic devices may be configured with various safeguards or protective equipment (e.g., protective modules) that protect the robotic device from the environment. Such safeguards/protective equipment often add extra weight to the robotic devices. This extra weight can affect the effectiveness and productivity of the robotic device while it is performing a particular activity in the environment. This extra weight becomes a larger issue when a robotic device may require multiple safeguards/protective equipment in order to perform particular activities in the environment. As such, there is a desire for a solution that provides the benefits of enabling a robotic device to enter a particular environment to perform one or more activities while proactively protecting the robotic device with the optimal amount of safeguards/protective equipment that does not impact the productivity or the efficiency of the robotic device performing the activity.

Before turning to the FIGs. it is noted that the benefits/novelties and intricacies of the proposed solution are that:

The robotic system may be configured to analyze the activity surrounding context of the one or more robots to identify if any of the one or more robots may receive any damage while performing an activity in the assigned surrounding. Based on identified predicted damage, the robotic system may provide the appropriate protection (e.g., one or more protection modules) to the one or more robots to prevent damage to the one or more robots.

The robotic system may be configured to perform visual and Internet of Things (IoT) feed analysis (e.g., using environment data) of the environment of interest (e.g., where the one or more robotic devices will perform the one or more activities). The robotic system may use this information (e.g., environment data) to identify types of environmental and working parameters and the type and/or amount of damage or potential problems a robotic device may encounter while performing one or more activities in the environment of interest. The robotic system may generate one or more simulations (e.g., via digital twin engine and/or simulation engine) to identify and apply the appropriate level of protection (e.g., protection modules) to the one or more robotic devices.

The robotic system may be configured to generate one or more digital twins to simulate the various results contemplated herein. The digital twins may be modified to correspond to the environment, various activities performed in the environment, and/or the one or more robotic devices that may interact with the environment.

In situations where the environment and current status (e.g., performance factors) are not determined to be damaging or negatively impactful (e.g., a robotic hazard), the robotic system may be configured to reduce to remove the one or more protective components from the robotic devices. Removing one or more protective components from the robotic devices reduces the weight and load of the robotic device, enabling the robotic device to perform the one or more activities with greater efficiency.

Based on the environment data associated with the environment (e.g., performance factors) and the one or more activities, the one or more robotic devices within the robotic system may be configured to collaborate with each of the other robotic devices. For example, a robotic device may be configured to communicate to other robotic devices within the environment that additional protective components (e.g., cooling jacket, shock absorber, etc.) may be needed for the robotic devices to complete the one or more activities in the environment.

Based on the context of the surroundings (e.g., environment of interest), the robotic system may identify the performance factors or types of scenarios that may cause the one or more robotic devices harm. As such, the robotic system may be configured to identify how the one or more activities should be sequenced (e.g., optimally sequenced) to minimize or reduce the aggregated protection cost associated with one or more robotic devices performing the one or more activities in the environment.

Referring now to FIG. 1, illustrated is a block diagram of an example robotic system 100 for optimizing robotic assembly, in accordance with aspects of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

As depicted in FIG. 1, robotic system 100 may be configured to include environment 102, environment data 104, digital twin engine 106, and protective module 108. In embodiments, environment 102 may refer to any space or area where one or more activities may be performed. For example, environment 102 may include, but is not limited to a room, an industrial floor of a factory, or an open outdoor construction site. The one or more actives activities may include any activity that may be performed by a robotic device, such as a robotic arm (e.g., robotic device) performing the assembly of a product within environment 102.

Environment 102 may be configured to include robotic device(s) 110 and one or more smart device(s) 112A-N. While embodiments herein may often make reference to the use of a single robotic device, any number of robotic devices 110 may be used to perform the one or more activities.

In embodiments, one or more robotic devices 110 may include any type of robotic technology available to perform the one or more activities in environment 102. For example, robotic device 110 may be a robotic arm configured to move throughout environment 102 as well as enter and exit environment 102 independent of human interaction. While in some embodiments robotic system 100 may configure the one or more robotic devices 110 to work independently within environment 102, in other embodiments, robotic system 100 may configure the one or more robotic devices 110 in concert with the other robotic devices. In these embodiments, the one or more robotic devices 110 may be configured to communicate various information to the other robotic devices within environment 102. This information may include, but is not limited to, the robotic device's various technical capabilities, information associated with environment 102 (e.g., potential robotic hazard or need for protective components), and the current ability of the robotic device to perform the one or more activities (e.g., is the robotic device damaged in some manner). While in some embodiments, each of one or more robotic devices 110 may be similarly configured with the same or similar capabilities, in other embodiments, some of the one or more robotic devices 110 may be configured with different capabilities or different types of robotic devices. For example, in some embodiments, some robotic devices 110 may be configured with robotic arms, while other robotic devices 110 may be configured with, or as part of, a robotic swarm base.

In embodiments, robotic system 100 may be configured to receive environment data 104 from environment 102. Environment data 104 may be associated with one or more robotic devices 110 and environment 102. In embodiments, robotic system 100 may configure one or more robotic devices 110 to perform one or more activities in environment 102. Environment data may include, but is not limited to, information or data associated with: i) the configuration of environment 102 (e.g., factory/worksite layout, dimensions of the environment); ii) the number and types of robotic devices 110 that may be used within environment 102 to perform the one or more activities (e.g., capabilities and configurations of robotic devices 110 and/or robotic mechanisms); iii) position/location of each a robotic devices 110, iv) performance factors associated with the environment (e.g., information associated with what impacts in the environment may affect the one or more robotic devices 110); v) number and type of different tasks that may be associated with performing the one or more activities; vi) information associated with robotic devices 110 performing the one or more activities (e.g., possible impacts and/or robotic hazards); vii) real-time information associated with the one or more activities in environment 102; viii) data associated with protection module 108 and each of the one or more protective components 114A-N (e.g., protective component capabilities, weight of the protective component, etc.); ix) how the protective components 114A-N may be used when performing one or more activities; x) information/data generated from various analyses contemplated herein (e.g., information/data generated by AI and machine learning analysis via digital twin 106 and/or simulation engine 116); and xi) databases having information/data associated with the one or more activities that may be the same or similar to the activities performed in environment 102, such as data relating to how much time was needed to perform various tasks or steps of each of the one or more activities or how particular changes in environment 102 may impact the one or more robotic devices 110 (e.g., while the one or more robotic devices 110 are in environment 102).

In embodiments, robotic system 100 may be configured to store environment data 104 collected over time in a historical repository. The historical repository may include any environment data 104 contemplated herein. In embodiments, robotic system 100 may access the historical repository to generate one or more simulations using AI and machine learning capabilities (e.g., digital twin 106/simulation engine 116). The information generated from these analyses may be considered assembly data and may also be stored within the historical repository.

In embodiments, robotic system 100 may analyze environment data 104 using simulation engine 116 (e.g., via digital twin engine 106) enabled to perform AI and machine learning analyses. While in some embodiments, robotic system 100 may receive one or more assembly maneuvers associated with assembling the object of interest from a database (e.g., assembly data), in other embodiments, robotic system 100 may analyze historical environment data from the historical repository and determine the one or more performance factors that may be needed to assemble or construct the object of interest (e.g., via one or more simulations). In some embodiments, robotic system 100 may configure simulation engine 116 (e.g., via digital twin engine 106) to generate one or more simulations of environment 102 using environment data 104. These simulations may be based on environment data received and collected in real-time and/or retrieved from the historical repository.

In embodiments, robotic system 100 may be configured to receive/collect environment data 104 from one or more smart devices 112A-N. Smart devices 112A-N may include, but are not limited to devices such as, Internet of Things (IoT) devices (e.g., scanning module IoT enabled devices), cameras, infrared sensors, ultrasounds, chemical sensors, or any combination thereof. In embodiments, robotic system 100 may configure one or more smart devices 112A-N to receive/collect environment data 104 associated with environment 102 in real-time and/or to collect environment data 104 over a particular time duration. Such environment data 104 may be stored in a historical repository and accessed as needed by robotic system 100 by digital twin engine 106 or simulation engine 116 (e.g., when using AI and machine learning capabilities performing the various simulations/analyses contemplated herein). While some smart devices 112A-N may be configured within the environment 102, in some embodiments, other smart devices 112A-N may be further configured within or associated with one or more robotic devices 110.

In embodiments, robotic system 100 may be configured to analyze environment data 104. In these embodiments, robotic system 100 may analyze and generate one or more simulations using one or more digital twins using digital twin engine 106. Digital twin engine 106 may be enabled with AI and machine learning technology. Digital twin engine 106 may generate one or more digital twins associated with environment 102, one or more robotic devices 110, protective module 108, environment data 104, or any combination thereof. While in some embodiments, digital twin engine 106 may be configured to perform any and all analyses contemplated herein, in other embodiments, digital twin engine 106 may be configured to further include simulation engine 116 (e.g., enable with AI and machine learning technology). Simulation engine 116 may be configured to generate one or more simulations using the one or more digital twins generated by digital twin engine 106. In some embodiments, simulation engine 116 may replace digital twin engine 106 and be configured by robotic system 100 to perform any of the various analyses contemplated herein.

In embodiments, robotic system 100 may include protective module 108. Protective module 108 may include one or more protective components 114A-N or any other element (e.g., coolant, protective coating spray, etc.) that may be used by robotic system 100 to protect or prevent robotic devices 110 from being damaged (e.g., being affected by the one or more performance factors) while performing one or more activities in environment 102. One or more protective components 114A-N may include, but are not limited to flame retardant equipment, shock absorbers, protective jackets (e.g., configured to prevent damage associated with acidic or basic environments), cooling equipment, or any combination thereof. While in some embodiments, protective module 108 may include additional devices that may be used to couple (e.g., attach, spray, etc.) or decouple the one or more protective components 114A-N to the one or more robotic devices 110, in other embodiments robotic devices 110 may be configured by robotic system 100 to self-apply the one or more protective components 114A-N. For example, protective module 108 may include additional robotic arms that may be used to apply flame retardant equipment to robotic device 110, or robotic device 110 may be configured with one or more robotic components that allows the robotic device 110 to apply the one or more protective components 114A-N to itself.

In embodiments, robotic system 100 may analyze environment data 104 to identify one or more performance factors (e.g., operational and/or environmental parameters) associated with the environment (e.g., using digital twin engine 106). Performance factors may refer to any aspect of environment 102 that may impact how the one or more robotic devices 110 perform activities in environment 102. For example, a performance factor may include, but is not limited to: i) environment 102 having extreme high or low temperatures, such as those resulting from environment 102 being engulfed in flames or having subzero temperatures (e.g., during manufacturing processes using components that are only stable at low temperatures); ii) having surfaces with varying heights (e.g., surfaces robotic device 110 may need to navigate to perform the necessary activity); iii) chemically contaminated environments, such as those that may have acidic or corrosive qualities; or iv) any combination thereof. While embodiments contemplated herein often refer to environment 102 as having a single performance factor, environment 102 may include any number of performance factors. While in some embodiments, environment 102 may have particular areas that have different performance factors (e.g., one area may have different surfaces of varying heights that robotic device 110 may have to navigate and another area that has an extreme temperature) in other embodiments, multiple performance factors may be associated with the entirety of environment 102 (e.g., all of environment 102 is engulfed in flames and has a high concentration of a particular corrosive chemical). In some embodiments, simulation engine 116 may use historical environment data stored in the historical repository (e.g., environment data 104) to generate a knowledge corpus to aid in identifying new or previously unidentified performance factors or changes (e.g., how a robotic device may be impacted, damaged, or otherwise affected while performing one or more activities) to environment 102. In these embodiments, robotic system 100 may use the knowledge corpus to further identify which of the one or more protective components 114A-N will mitigate the impact associated with the performance factor (e.g., previously unidentified performance factor).

In embodiments, robotic system 100 may generate one or more simulations (e.g., via digital twin 106 and/or simulation engine 116) associated with the one or more performance factors identified and one or more robotic devices 110 in environment 102. In these embodiments, robotic system 100 may use these simulations to determine one or more impacts of the performance factors associated with environment 102 on the one or more robotic devices 110. Using the aforementioned simulations, robotic system 100 may determine the impact of the one or more performance factors is a robotic hazard. Robotic hazards may occur when the one or more robotic devices 110 are negatively impacted (e.g., damaged) by the one or more performance factors. In embodiments, robotic system 100 may simulate the identified robotic hazard and environment data 104 associated with protective module 108 (e.g., one or more protective components 114A-N) to identify if protective module 108 can mitigate the robotic hazard. If protective module 108 can mitigate the robotic hazard (e.g., has a particular protective component that can protect robotic device 110 from the robotic hazard), then robotic system 100 may apply the protection (e.g., the particular protective component) from protection module 108 to one or more robotic devices 110.

In embodiments, robotic system 100 may consider environment data 104 associated with the one or more protective components 114A-N associated with protective module 108. In these embodiments, robotic system 100 may simulate and determine whether one or more protective components 114A-N mitigates or eliminates the impact of the robotic hazards (e.g., negatively impactful performance factors) of environment 102 on one or more robotic devices 110.

In embodiments where robotic system 100 determines (e.g., digital twin engine 106 and/or simulation engine 116) that one or more protective components 114A-N may mitigate or reduce the impact of the robotic hazards (e.g., one or more performance factors), robotic system 100 may apply one or more protective modules to the one or more robotic device 110, prior to robotic devices 110 entering environment 102. For example, in embodiments where robotic system 100 receives environment data 104 (e.g., from one or more smart devices 112A-N) associated with environment 102 and identifies that environment 102 has high temperatures (e.g., a performance factor), robotic system 100 may apply a flame retardant jacket (e.g., protective component) to one or more robotic devices 110 before the robotic devices enter environment 102. By identifying the one or more performance factors or robotic hazards that may affect one or more robotic devices 110, robotic system 100 can prevent the robotic devices from being impacted (e.g., negatively impacted) when performing the one or more activities in environment 102.

In some embodiments, robotic system 100 may analyze environment data 104 and determine that one or more robotic devices 110 already has a particular protective component of the one or more protective components 114A-N applied to the robotic device 110. In these embodiments, robotic system 100 may analyze the environment data 104 associated with the robotic device 110 and the particular protective component to determine if the currently applied particular protective component mitigates or eliminates the impact of the one or more robotic hazards. In embodiments where the particular protective component does not mitigate or eliminate the impact of at least one of the one or more robotic hazards on robotic devices 110, robotic system 100 may remove the particular protective component. In some embodiments, robotic system 100 may replace the particular protective component with a different protective component of the one or more protective components 114A-N that has been identified as mitigating or eliminating the impact of the robotic hazard (e.g., performance factor) on the robotic devices.

In some embodiments, robotic system 100 may be configured to simulate how one or more robotic devices 110 perform the one or more activities in environment 102 (e.g., simulation engine 116). In these embodiments, robotic system 100 may use these one or more simulations to identify an optimal amount of the one or more protection components 114A-N for each of the one or more robotic devices 110 used to perform the one or more activities. Though it may seem easier for robotic devices 110 to include as many protective components 114A-N as possible in order to sufficiently protect the robotic device, the additional weight and possible decrease in movement resulting from the constraints of the protective component (e.g., cooling jacket may reduce robotic arm's ability to move freely) often result in an increased time and resources associated with performing the one or more activities (e.g., requiring more battery charges or additional robotic maneuvers to overcome range of motion issues).

As such, by providing an optimal amount of the one or more protection components 114A-N for each of the one or more robotic devices 110 (e.g., sufficient to prevent damage to the robotic devices without adding unnecessary weight), robotic system 100 ensures that the one or more activities performed in environment 102 by robotic devices 110 are performed in a productive and efficient manner. While in some embodiments, all of the robotic devices have the same amount or type of one or more protection components 114A-N, in other embodiments, the optimal amount of the one or more protection components 114A-N may differ between the one or more robotic devices 110. In these embodiments, the optimal amount of the one or more protection components 114A-N may differ based on the type of one or more of the robotic devices 110 and/or what task or process the robotic device may be executing when performing the one or more activities. For example, some robotic devices 110 may perform an activity that requires a robotic arm to assemble something, while other robotic devices may be mobile robotic devices configured to move objects and materials in and out of environment 102.

In some embodiments, robotic system 100 may base the optimal amount on a particular activity sequence of the one or more activities. For example, in embodiments where more than one activity is performed, the robotic devices 110 may encounter more than one robotic hazard (e.g., performance factor negatively impacting robotic devices 110) at different times. In these embodiments, robotic system 100 may apply and remove different protective components from the one or robotic devices 110 while the robotic devices 110 are performing one or more activities. For example, robotic system 100 may instruct the one or more robotic devices 110, configured with shock absorbing equipment and a flame retardant jacket (e.g., protective components 114A-N), to remove the flame retardant jacket after performing one activity but to continue utilizing shock absorbing equipment while performing the next activity.

In some embodiments, robotic system 100 may base the optimal amount of one or more protective components 114A-N applied to one or more robotic devices 110 on a particular time duration associated with each of the one or more activities and/or the task each of the one or more robotic devices 110 may be required to perform associated with a particular activity. Robotic system 100 may use simulation engine 116 (e.g., digital twin engine 106) to generate simulations associated with the optimal amount of one or more protective components 114A-N. In some example embodiments, some robotic devices 110 may occupy environment 102 for longer durations of time to perform one or more activities, and as a result have prolonged exposure to the one or more performance factors (e.g., robotic hazards) associated with environment 102. Because of this prolonged exposure, robotic devices may have a different or more of one type of protective component (e.g., optimal amount). For example, a robotic device that will be exposed to high temperature and flames for a longer duration than another robotic device may have multiple types of heat resistant and flame resistant equipment, while the other robotic device may have a single layer of coolant spray.

In embodiments, robotic system 100 may analyze the environment data 104 associated with environment 102 in real-time. Using this real-time-environment data 104, robotic system 100 may utilize digital twin engine 106 to identify if a change in the one or more performance factors associated with environment 102 has occurred. In some embodiments, an identified change in performance factors may be identified as a new robotic hazard. Examples of a change may include, but are not limited to, changes in temperature, changes in environment structure (e.g., environment 102 is a building in the process of collapsing), changes in chemical concentrations (e.g., environment 102 is no longer extremely acidic), etc. In these embodiments, robotic system 100 may simulate the change and the one or more robotic devices to determine an impact of the change on the one or more robotic devices (e.g., whether the change is a robotic hazard). Robotic system 100 may use these one or more simulations to determine whether the change in the performance factor may require additional protective components or fewer protective components. In these embodiments, robotic system 100 may dynamically update the one or more protective components 114A-N applied to one or more robotic devices 110.

Figure 2:
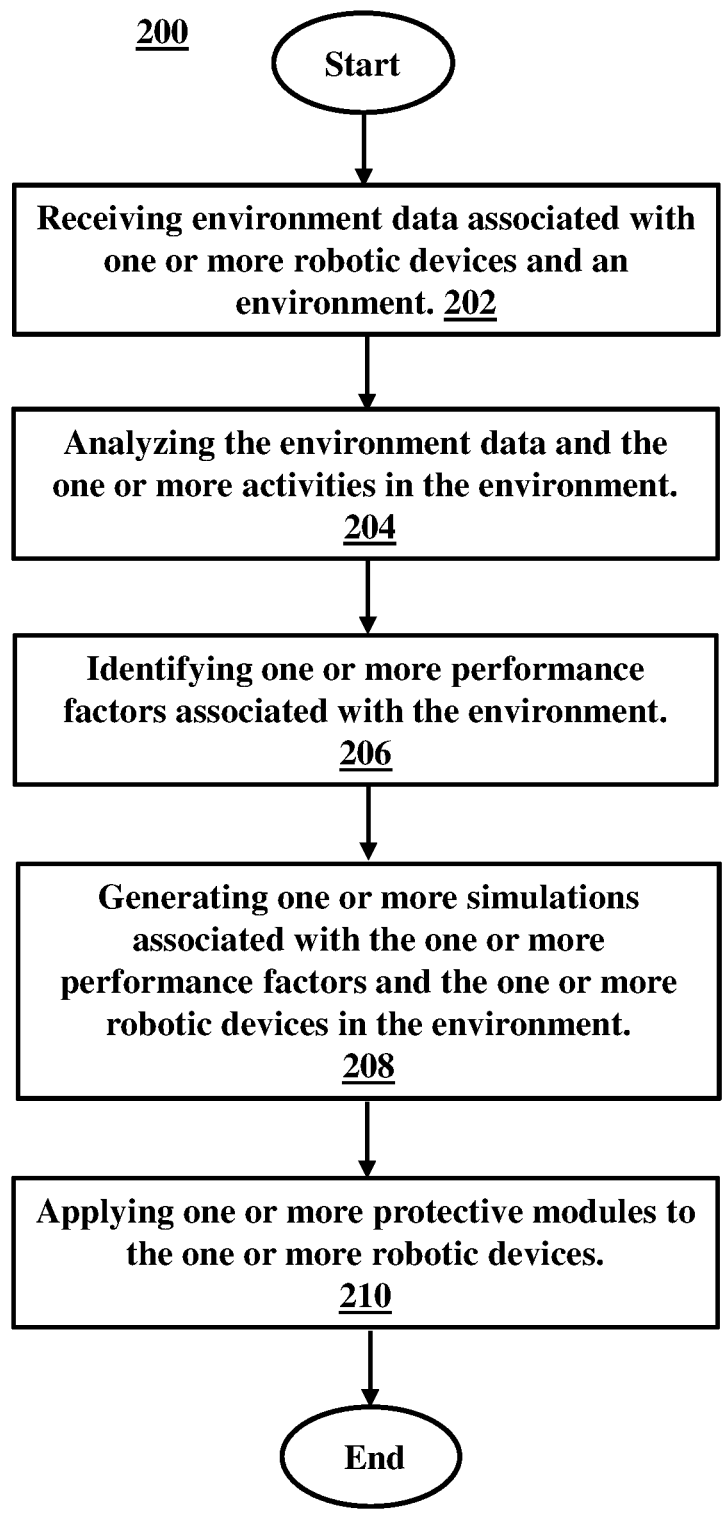
FIG. 2 illustrates a flowchart of an example method for optimizing robotic device performance in a smart environment, in accordance with aspects of the present disclosure.

Referring now to FIG. 2, a flowchart illustrates an example method 200 for optimizing robotic device performance, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive environment data associated with one or more robotic devices and an environment. In embodiments, the one or more robotic devices may be configured to perform one or more activities in the environment. In some embodiments, the method 200 proceeds to operation 204.

At operation 204, a processor may analyze the environment data and the one or more activities in the environment. In some embodiments, the method 200 proceeds to operation 206.

At operation 206, a processor may identify one or more performance factors associated with the environment. In some embodiments, the method 200 may proceed to operation 208.

At operation 208, a processor may generate one or more simulations associated with the one or more performance factors and the one or more robotic devices in the environment. In some embodiments, the method 200 may proceed to operation 210.

At operation 210, a processor may apply one or more protective components to the one or more robotic devices. In some embodiments, applying the one or more protective components to the one or more robotic devices may be based, at least in part, on the one or more simulations. In some embodiments, as depicted in FIG. 2, after operation 208, the method 200 may end.

In some embodiments, discussed below there are one or more operations of the method 200 not depicted for the sake of brevity and which are discussed throughout this disclosure. Accordingly, in some embodiments, the processor may analyze the environment data associated with the environment in real-time to identify a change associated with the environment has occurred. In these embodiments, the change and the one or more robotic devices may be used to determine an impact of the change on the one or more robotic devices. In some embodiments, the processor dynamically updates the one or more protective components applied to the one or more robotic devices.

In some embodiments, the processor may simulate an impact of the one or more performance factors on the one or more robotic devices performing the one or more or more activities to identify an impact of the performance factors on the one or more robotic devices. The processor may then determine if the impact is a robotic hazard. In these embodiments, the processor may further simulate the robotic hazard and the one or more protective components. This may identify a particular protective module of the one or more protective components configured to mitigate the robotic hazard. The processor may then apply the particular protective module to the one or more robotic devices.

In some embodiments, when applying the one or more protective components to the one or more robotic devices, the processor may simulate the one or more robotic devices performing the one or more activities to identify an optimal amount of the one or more protection modules for each of the one or more robotic devices. In these embodiments, the optimal amount may be associated with a particular activity sequence of the one or more activities.

In some embodiments, when applying the one or more protective components to the one or more robotic devices, the processor may simulate the one or more robotic devices performing the one or more activities to identify an optimal amount of the one or more protection modules for each of the one or more robotic devices. In these embodiments, the optimal amount may be associated with a particular time duration associated with each of the one or more activities.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
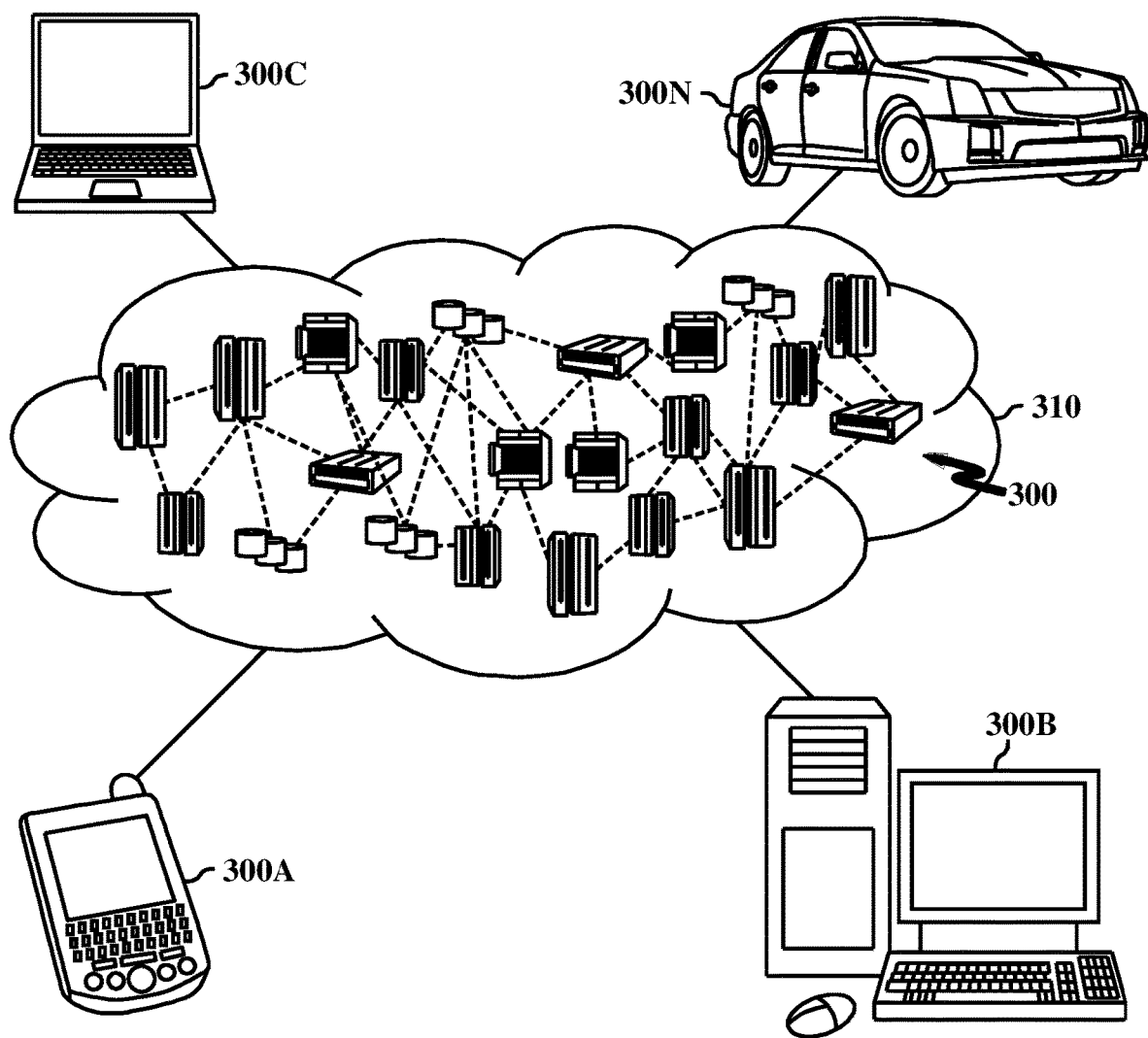
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
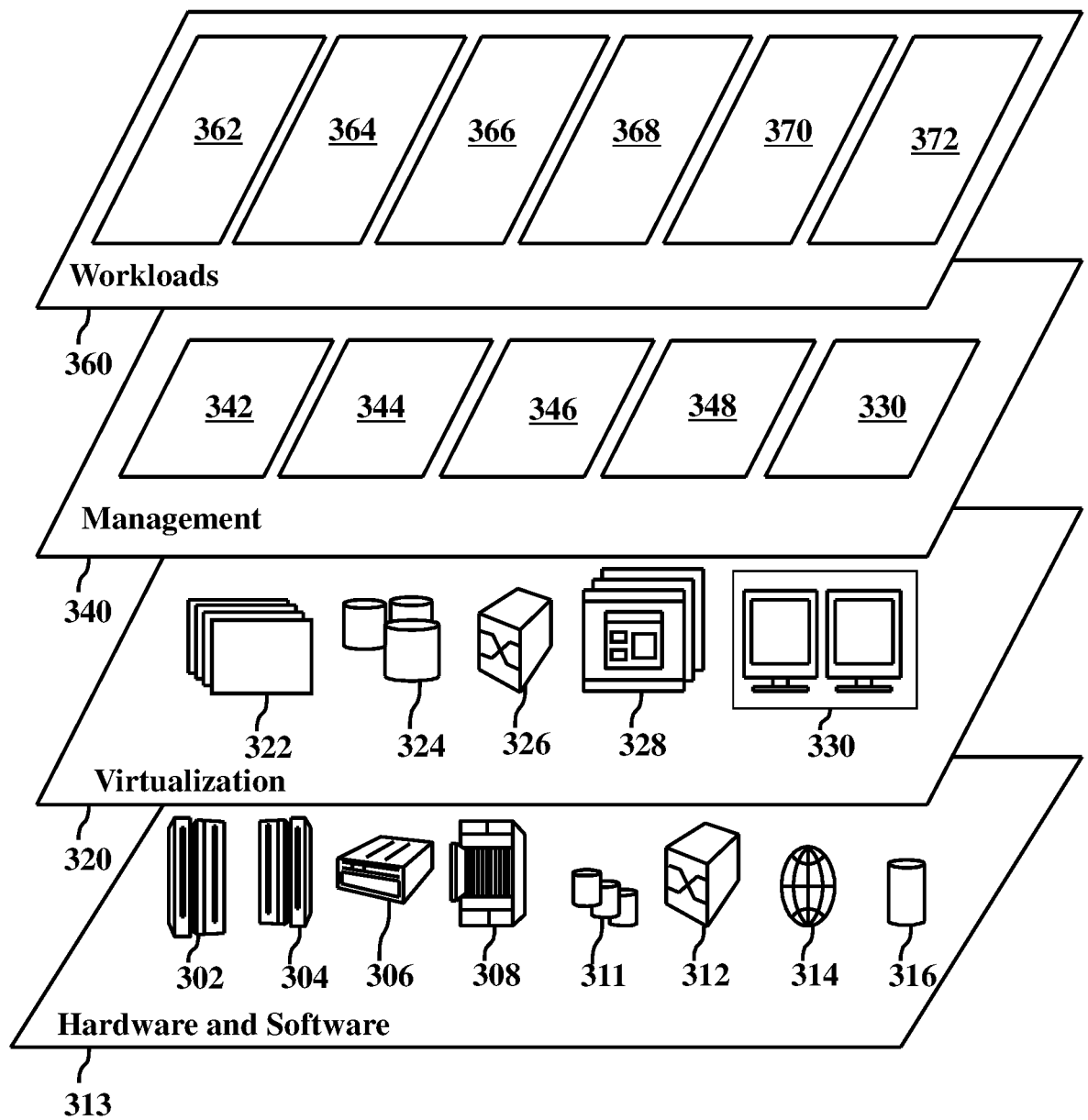
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and robotic optimization 372.

Figure 4:
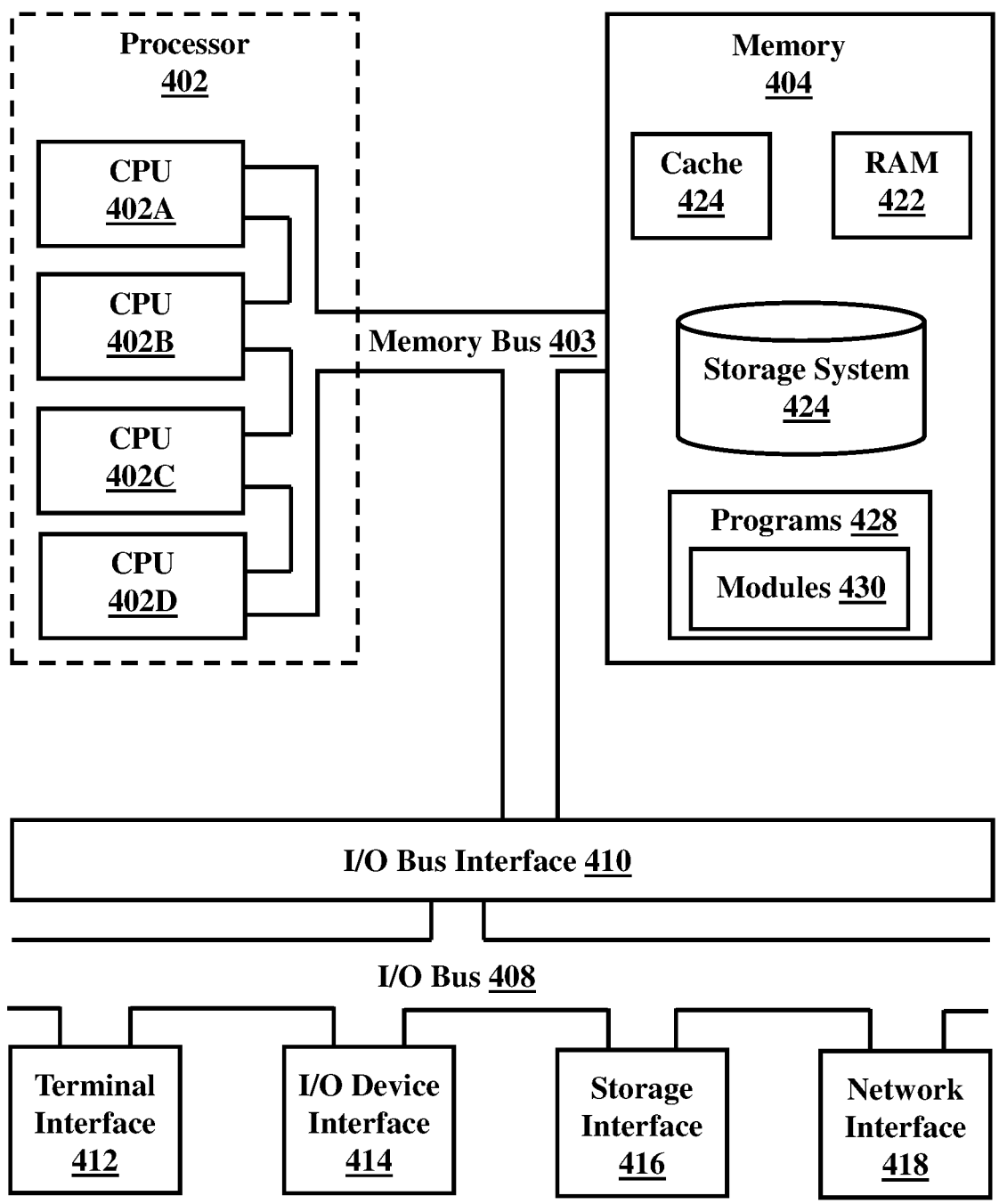
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
receiving, by a processor, environment data associated with one or more robotic devices and an environment, wherein the one or more robotic devices are configured to perform one or more activities in the environment;
analyzing the environment data and the one or more activities in the environment;
identifying one or more performance factors associated with the environment;
generating one or more simulations associated with the one or more performance factors and the one or more robotic devices in the environment using a digital twin engine, wherein the one or more simulations are generated by accessing a historical repository of the environment data that is stored over time using machine learning;
applying one or more physical protective components to the one or more robotic devices, wherein applying the one or more physical protective components to the one or more robotic devices is based, at least in part, on the one or more simulations when the one or more simulations indicate to apply protection to the one or more robotic devices; and
removing the one or more physical protective components when the one or more simulations indicate that the protection of the one or more robotic devices is not necessary.

2. The method of claim 1, further comprising:
dynamically updating the one or more physical protective components applied to the one or more robotic devices.

3. The method of claim 1, further comprising:
simulating an impact of the one or more performance factors on the one or more robotic devices performing the one or more or more activities;
identifying an impact of the one or more performance factors on the one or more robotic devices; and
determining the impact is a robotic hazard.

4. The method of claim 3 including:
simulating the robotic hazard and the one or more physical protective components;
identifying a particular physical protective component of the one or more physical protective components configured to reduce an effect of the robotic hazard; and
applying the particular physical protective component to the one or more robotic devices.

5. The method of claim 1, wherein applying the one or more physical protective components to the one or more robotic devices, includes:
simulating the one or more robotic devices performing the one or more activities; and
identifying an optimal amount of the one or more physical protective components for each of the one or more robotic devices, wherein the optimal amount is associated with a particular activity sequence of the one or more activities.

6. The method of claim 1, wherein applying the one or more physical protective components to the one or more robotic devices, includes:
simulating the one or more robotic devices performing the one or more activities; and
identifying an optimal amount of the one or more physical protective components for each of the one or more robotic devices, wherein the optimal amount is associated with a particular time duration associated with each of the one or more activities.

7. A system, the system comprising:
a memory; and
a processor in communication with the memory, the processor being configured to perform operations comprising:
receiving environment data associated with one or more robotic devices and an environment, wherein the one or more robotic devices are configured to perform one or more activities in the environment;
analyzing the environment data and the one or more activities in the environment;
identifying one or more performance factors associated with the environment;
generating one or more simulations associated with the one or more performance factors and the one or more robotic devices in the environment using a digital twin engine, wherein the one or more simulations are generated by accessing a historical repository of the environment data that is stored over time using machine learning;
applying one or more physical protective components to the one or more robotic devices, wherein applying the one or more physical protective components to the one or more robotic devices is based, at least in part, on the one or more simulations when the one or more simulations indicate to apply protection to the one or more robotic devices; and
removing the one or more physical protective components when the one or more simulations indicate that the protection of the one or more robotic devices is not necessary.

8. The system of claim 7, wherein the operations are further comprising:
dynamically updating the one or more physical protective components applied to the one or more robotic devices.

9. The system of claim 7, the operations further comprising:
simulating an impact of the one or more performance factors on the one or more robotic devices performing the one or more or more activities;
identifying an impact of the one or more performance factors on the one or more robotic devices; and
determining the impact is a robotic hazard.

10. The system of claim 9, the operations further comprising:
simulating the robotic hazard and the one or more physical protective components;
identifying a particular physical protective component of the one or more physical protective components configured to reduce an effect of the robotic hazard; and
applying the particular physical protective component to the one or more robotic devices.

11. The system of claim 7, wherein applying the one or more physical protective components to the one or more robotic devices, includes:
simulating the one or more robotic devices performing the one or more activities; and
identifying an optimal amount of the one or more physical protective components for each of the one or more robotic devices, wherein the optimal amount is associated with a particular activity sequence of the one or more activities.

12. The system of claim 7, wherein applying the one or more physical protective components to the one or more robotic devices, includes:
simulating the one or more robotic devices performing the one or more activities; and identifying an optimal amount of the one or more physical protective components for each of the one or more robotic devices, wherein the optimal amount is associated with a particular time duration associated with each of the one or more activities.

13. A computer program product, the computer program product comprising:
environment data associated with one or more robotic devices and an environment, wherein the one or more robotic devices are configured to perform one or more activities in the environment;
one or more computer-readable, non-transitory storage media;
program instructions, stored on at least one of the one or more storage media, to analyze the environment data and the one or more activities in the environment;
program instructions, stored on at least one of the one or more storage media, to identify one or more performance factors associated with the environment;
program instructions, stored on at least one of the one or more storage media, to generate one or more simulations associated with the one or more performance factors and the one or more robotic devices in the environment using a digital twin engine, wherein the one or more simulations are generated by accessing a historical repository of the environment data that is stored over time using machine learning;
program instructions, stored on at least one of the one or more storage media, to apply one or more physical protective components to the one or more robotic devices, wherein applying the one or more physical protective components to the one or more robotic devices is based, at least in part, on the one or more simulations when the one or more simulations indicate to apply protection to the one or more robotic devices; and
program instructions, stored on at least one of the one or more storage media, to remove the one or more physical protective components when the one or more simulations indicate that the protection of the one or more robotic devices is not necessary.

14. The computer program product of claim 13, further comprising:
program instructions, stored on at least one of the one or more storage media, to dynamically update the one or more physical protective components applied to the one or more robotic devices.

15. The computer program product of claim 13, further comprising:
program instructions, stored on at least one of the one or more storage media, to simulate an impact of the one or more performance factors on the one or more robotic devices performing the one or more or more activities;
program instructions, stored on at least one of the one or more storage media, to identify an impact of the one or more performance factors on the one or more robotic devices; and
program instructions, stored on at least one of the one or more storage media, to determine the impact is a robotic hazard.

16. The computer program product of claim 15, further comprising:
program instructions, stored on at least one of the one or more storage media, to simulate the robotic hazard and the one or more physical protective components;
program instructions, stored on at least one of the one or more storage media, to identify a particular physical protective component of the one or more physical protective components configured to reduce an effect of the robotic hazard; and
program instructions, stored on at least one of the one or more storage media, to apply the particular physical protective component to the one or more robotic devices.

17. The computer program product of claim 13, wherein the apply the one or more physical protective components to the one or more robotic devices, includes:
program instructions, stored on at least one of the one or more storage media, to simulate the one or more robotic devices performing the one or more activities; and
program instructions, stored on at least one of the one or more storage media, to identify an optimal amount of the one or more physical protective components for each of the one or more robotic devices, wherein the optimal amount is associated with a particular activity sequence of the one or more activities.

* * * * *